United States Patent [19]

Dayton

[11] Patent Number: 4,868,888

[45] Date of Patent: Sep. 19, 1989

[54] AUDIO COMMUNICATIONS MODULE FOR AN OFFICE CHAIR

[75] Inventor: Douglas C. Dayton, Harvard, Mass.

[73] Assignee: Wang Laboratories, Inc., Lowell, Mass.

[21] Appl. No.: 920,806

[22] Filed: Oct. 17, 1986

[51] Int. Cl.[4] .............................. H04B 1/34

[52] U.S. Cl. .............................. 455/90; 455/95; 455/128; 455/344; 455/347; 381/156; 381/205; 297/194

[58] Field of Search .............................. 455/89, 90, 95, 128, 455/344, 347, 348, 350, 351; 381/155, 156, 188, 205; 379/428, 432, 434, 440, 436; 297/194

[56] References Cited

U.S. PATENT DOCUMENTS

| | | | |
|---|---|---|---|
| 1,864,615 | 6/1932 | Quinby | 381/205 |
| 2,370,359 | 2/1945 | McCart | 381/205 |
| 3,851,123 | 11/1974 | Lipinski et al. | 455/344 |
| 3,928,723 | 12/1975 | Kai | 379/432 |
| 3,976,162 | 8/1976 | Cummings | 381/205 |
| 4,023,566 | 5/1977 | Martinmaas | 381/188 |
| 4,027,112 | 5/1977 | Heppner et al. | 381/205 |
| 4,142,312 | 3/1979 | Stokes | 379/432 |
| 4,584,603 | 4/1986 | Harrison | 455/3 |

FOREIGN PATENT DOCUMENTS

| | | | |
|---|---|---|---|
| 1546533 | 12/1933 | Australia | 297/194 |
| 719120 | 10/1965 | Canada | 297/194 |
| 2628216 | 12/1977 | Fed. Rep. of Germany | 297/194 |
| 3025691 | 2/1982 | Fed. Rep. of Germany | 381/188 |
| 55-03233 | 1/1980 | Japan | 381/188 |
| 225604 | 12/1924 | United Kingdom | 381/188 |

*Primary Examiner*—Douglas W. Olms
*Assistant Examiner*—Curtis Kuntz
*Attorney, Agent, or Firm*—Michael H. Shanahan; Kenneth L. Milik

[57] ABSTRACT

An audio communications system for an office chair provides a user with private listening of RF transmitted audio messages in an exposed environment such as an office area, without the use of headphones. An audio module, which mounts to the backrest of an office chair, includes an RF receiver and a shaped, acoustic horn loudspeaker which directs sound upwardly, behind the user's head, while minimizing lateral dispersion of the sound. In another aspect of the invention, the audio communications system includes a transceiver for two-way communication, such as telephone, and an armrest mounted microphone and keypad.

18 Claims, 4 Drawing Sheets

AUDIO COMMUNICATIONS MODULE FOR AN OFFICE CHAIR

FIELD

The invention relates to audio communications systems generally and more particularly to an audio communications system, mountable on office chair, which provides private audio communications capability in an exposed environment, such as an office area, without any fixed connection.

BACKGROUND

The uses of audio technology for communicating information simply and rapidly has long been recognized, and the modern office worker now relies extensively on audio communications systems as an aid for conducting his business. Telephones, messaginq systems, and dictation equipment are vital timesavers in most offices. This reliance is likely to increase as computers having text to voice message facilities become widely available.

In order to make effective use of conventional audio communications systems which employ loudspeakers, it is desirable that the office environment provide sufficient quiet and privacy, so that the user may clearly hear the output of the loudspeaker, while not disturbing his co-workers.

The trend toward the open plan office has diminished somewhat the freedom that the office worker has to effectively use communications devices which employ loudspeakers. In the open plan office, partial-height acoustic partitions are used to separate individual work areas. This "cubical" approach has many advantages in the modern company, the chief one being its flexibility. As companies undergo rapid growth or change, the partitions may be easily and inexpensively reassembled into new, more desirable office configurations.

Unfortunately, even though the partitions contain sound proofing materials, many open plan office environments are noisy and without privacy. Telephone conversations can be heard over the partitions. These offices do not provide the desirable degree of privacy for free use of conventional audio communications systems. Even the use of the speakerphone must be minimized, as it can contribute to sound intrusion levels. To cope with these problems, the office worker must limit himself to the use of handsets or headphones, rather than loudspeaker devices, to gain to control of sound intrusion levels and to ensure a degree of privacy in audio reception.

Besides being uncomfortable during extended periods of use, handsets and headphones generally mean that the office worker must be connected by a wire or cord to the audio communications device. This physical connection restricts the amount of mobility an office worker can enjoy within his office space. Further, where office workers spend most of their workday in an office chair supported on casters, wires and cords can get in the way and be rolled over and damaged.

Ideally, sound from the text-to-speech computer interface or simply a telephone should be presented such that the user is not linked to any part of the office by a cord. Yet it is important that the audio output be something the user can easily hear at all positions within the office (to maximize the utilization of the office space) while not disturbing others in the same office or in adjacent offices.

SUMMARY

It is an object of the present invention to provide an audio communication system, for use in office environments, which allows a the user to receive audio messages in relative privacy, without disturbing co-workers in nearby offices.

It is a another object of the present invention to provide an audio communications system which is mountable on a standard office chair.

It is further object of the present invention to provide an audio communications system which does not require the use of a handset or headphones.

It is a still further object of the present invention to provide an audio communications system which does not require a physical connection to a host device, in the form of cords or wires, allowing the user to enjoy mobility in the office environment.

In accordance with the following principles, an audio communications system is provided which allows private listening of RF transmitted audio messages in an exposed environment such as an office area, without the use of headphones. The audio communications system is in the form of an audio communications module which mounts on the rear backrest of a standard office chair. The audio communications module includes an RF transceiver for receiving transmitted signals representative of audio messages. The audio communications module further includes a novel loudspeaker system which uses an acoustic horn loudspeaker, specially shaped to direct sound upwardly, behind the user's head, so as to create a sound envelope, such that the user can hear the audio output while others in close proximity to the user cannot hear, nor be disturbed by, the user's audio output. The loudspeaker design minimizes lateral dispersion of the sound and locates the source of the sound close to the user's ears without the encumberance of a piece of apparatus, such as a headset. The audio communications system operates effectively with the user simply seated in the office chair, without special regard for positioning the head with respect the the backrest. And the user is provided with freedom of movement within the office environment, without the encumberance or wires or cords.

A low power transceiver, within the audio communications module, provides a short range communications link to external communications devices such as a telephone system, a computer, and broadcast sources, such as radio and television, as well as prerecorded entertainment or information sources, such as cassette tapes or dictaphone. The operating frequency in the transceiver is matched in frequency to a complementary transceiver in the external device.

In another aspect of the present invention, the audio communications system includes an armrest mounted module for providing full, two-way telephone capability to the user. The armrest module includes a directional microphone, preamplifier, touch tone0keypad, and control switches for selecting different modes and other input parameters. The armrest module is linked by wire to the transceiver in the audio communications module. Seated in the office chair at any location in the office environment, a user may dial a telephone number and converse in normal voice levels while listening in relative privacy.

BRIEF DESCRIPTION OF THE DRAWINGS

The foregoing and other objects, features and advantages of the invention will be apparent from the following more particular description of a preferred embodiment of the invention, in conjunction with the accompanying drawings. In the drawings.

DESCRIPTION OF THE PREFERRED EMBODIMENT

Figure 1:
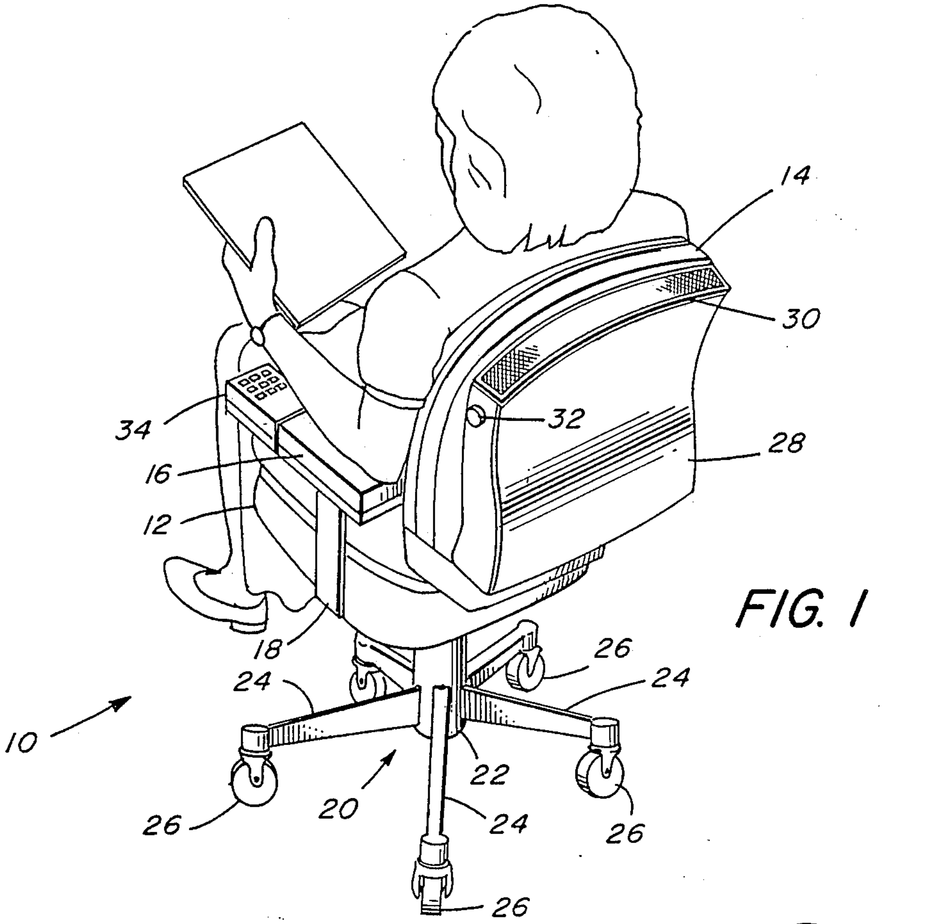
FIG. 1 is a perspective view of an office chair which has the present invention mounted thereon.

Referring now to the drawings and initially to FIG. 1, an office chair is shown which incorporates an audio communications system in accordance with the present invention. The office chair 10 includes a seat 12 and a backrest 14, which consist of fabric-covered cushions to provide a level of comfort to the user. Armrests 16 (only one shown) are held fixed by armrest supports 18 (only one shown). The seat 12 and backrest 14 are supported by a swivel base 20. The swivel base 20 includes a hub 22 and a number of radially extending legs 24, each having a caster 26 at the end to provide the user with mobility in the office environment.

The structure of office chair 10 is typical of many ergonomically designed chairs in widespread use today. An example of a chair of this type is the Ergon chair manufactured by Herman Miller, Incorporated of Zeeland, Mich. Also incorporated in the office chair 10 are a number of user adjustable features, such as a tension adjustment on the chair tilting mechanism, a seat height adjustment, and a backrest height adjustment. Moreover, the backrest of the ergonomically designed chair usually contain a slight curvature to conform to the users spinal or lumbar curve, and thereby provide proper spinal support. These features form no part of the present invention, but serve to demonstrate that is well recognized by office chair manufacturers that the modern office worker spends a large percentage of his worktime sitting in office chair and interacting with the office environment. The ergonomically designed chair allows a user to sit comfortably for extended periods of time and to enjoy a degree of mobility within that environment.

In connection with the present invention, it is important to note the relationship between the height of the backrest 14 and the head, neck, and shoulders of the typical adult user, as depicted in FIG. 1. The top edge of the backrest 14 extends to approximately mid-shoulder level for a user of average height, and under no circumstances will the head of an adult user be below the top surface of the backrest.

An audio communications module, referred to by the general reference character 28, is shown mounted on the rear of the backrest 14. The audio communications module 28 provides a telephone system or from a computer system using a text-to-speech translation facility, with no fixed connection in the form of cords or wires. The audio communications module is a light-weight structure and mounts on the upper portion of the backrest 14 by means of an adhesive. Alternatively, an adhesive backed foam pad may be used between the audio communications module 28 and the backrest 14, to provide a good seal where the backrest 14 may be contoured.

The audio communications module 28 includes RF communications means for receiving a transmitted signal representative of audio output from a host device; acoustic transducer means, for converting the received signal into sound; and acoustic focusing means, for directing the sound through a grill 30. The sound is focused upwardly, in a narrow sound envelope behind the head of the user, with minimal lateral dispersion. This allows the user to clearly hear the audio message with relative privacy and without adding to the ambient sound levels in the office environment. A volume control 32 is provided for adjusting the sound to the desired comfort level. Satisfactory results are obtained by setting the volume control slightly above ambient sound levels for the particular office environment.

In the preferred embodiment, the audio communications module 28 is a self-contained unit, designed to be installed on any standard office chair similar the one illustrated in FIG. 1. The audio communications module 28 has a thickness on the order of three inches, and will mount on the backrest 14, without detracting from the appearance of the chair.

A microphone module 34 is shown mounted on armrest 16 of the chair 10, to provide an input for two-way communications with a host device. Ideally, the microphone module 34 is attached to armrest 16 by a hinged mounting, such that module 34 may be folded downward into a storage position when not in use.

Figure 2:
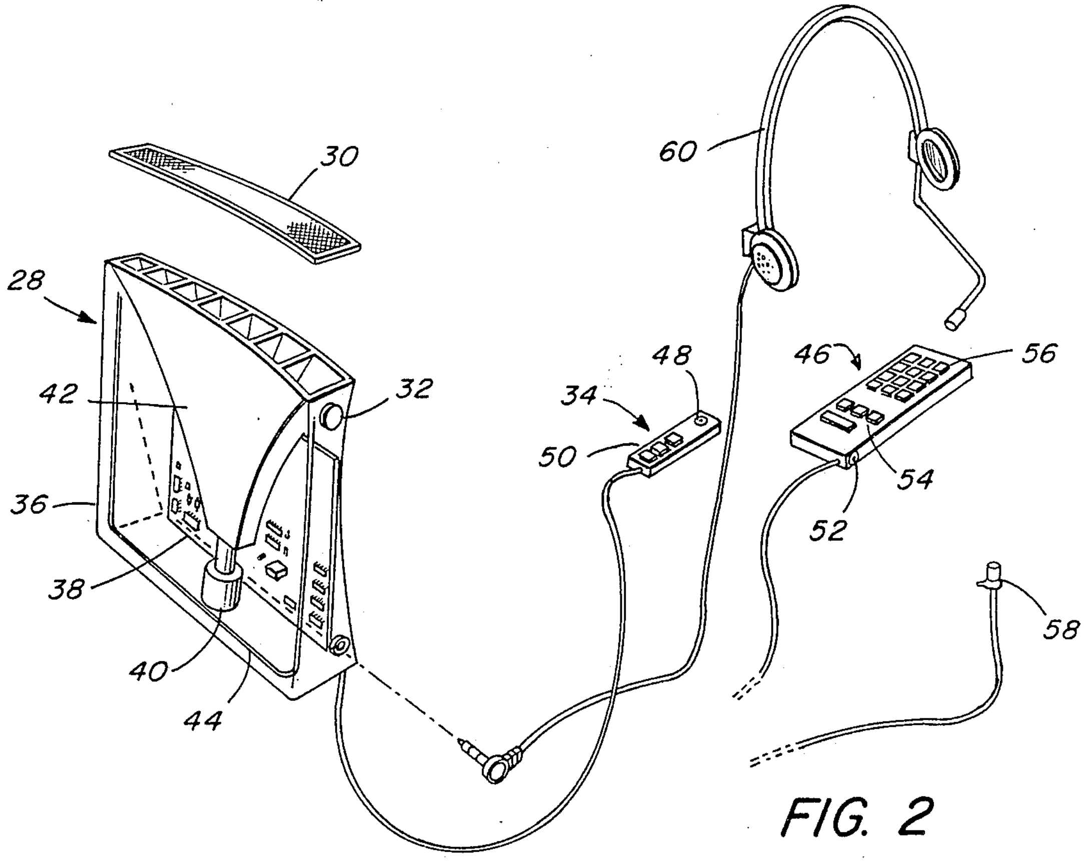
FIG. 2 is a perspective view of the preferred embodiment of the present invention, showing its major components.

Turning now to FIG. 2, the audio communications system of the present invention is illustrated in more detail. The audio communications module 28 includes a housing 36 made of durable plastic.

Printed circuit board 38, mounted within the housing, contains an FM transceiver and amplifier. An acoustic transducer 40 converts the electrical output of the amplifier into acoustic energy. The acoustic transducer 40 is coupled to an acoustic horn 42. The acoustic horn 42 functions as a sound amplifier and sound shaping device. The acoustic horn 42 is mounted in the housing, such that the mouth of the acoustic horn 42 is aligned with the grill 30 at the top of the housing. The design of the acoustic horn 40 is central to the present invention and will be discussed in more detail in connection with FIG. 4 and FIG. 5.

The power supply for the printed circuit board 38 is in the form of a standard rechargable battery pack (not shown), which the user would periodically recharge when the audio communications module 28 is not is use. An antenna 44 is mounted on the inside periphery of the housing 36, and is coupled to the transceiver of printed circuit board 38.

In the preferred embodiment of the present invention, a number of optional features are provided to suit the needs of the individual user. Microphone module 34 and telephone module 46 are each designed to be mounted on the armrest 16, and both provide input means for two-way communications with a host device. Microphone module 34 includes a sensitive directional microphone 48 and selection switches 50. The microphone 48 is adjusted to point directly at the user head, to maximize reception of the user's voice, and the selection switches 50 control the microphone input function. A user may replace the microphone module 34 with telephone module 46. The telephone module 46 contains a similar directional microphone 52 and selection switches 54 and, in addition, a keypad 56 for touch tone dialing. Both the microphone module and the telephone module are fully integrated with the audio communication module 28. The selection switches 50 and 56 may additionally be used for remote actuation of a host device.

Also in the preferred embodiment, a lapel microphone 58 or a combined headset/microphone 60 may be substituted when the mounting chair 10 does not include an armrest, when maximum privacy are required, or when ambient office sound levels are exceeding high. When the combined headset/microphone are plugged into the audio communications module 28, the internal loudspeaker system is locked out. However, this should not ordinarily be necessary. In tests conducted in ambient office sound levels, very satisfactory results were obtained with the user speaking in normal voice levels and the directional microphone 48 or 52 located at the armrest 16.

Figure 3:
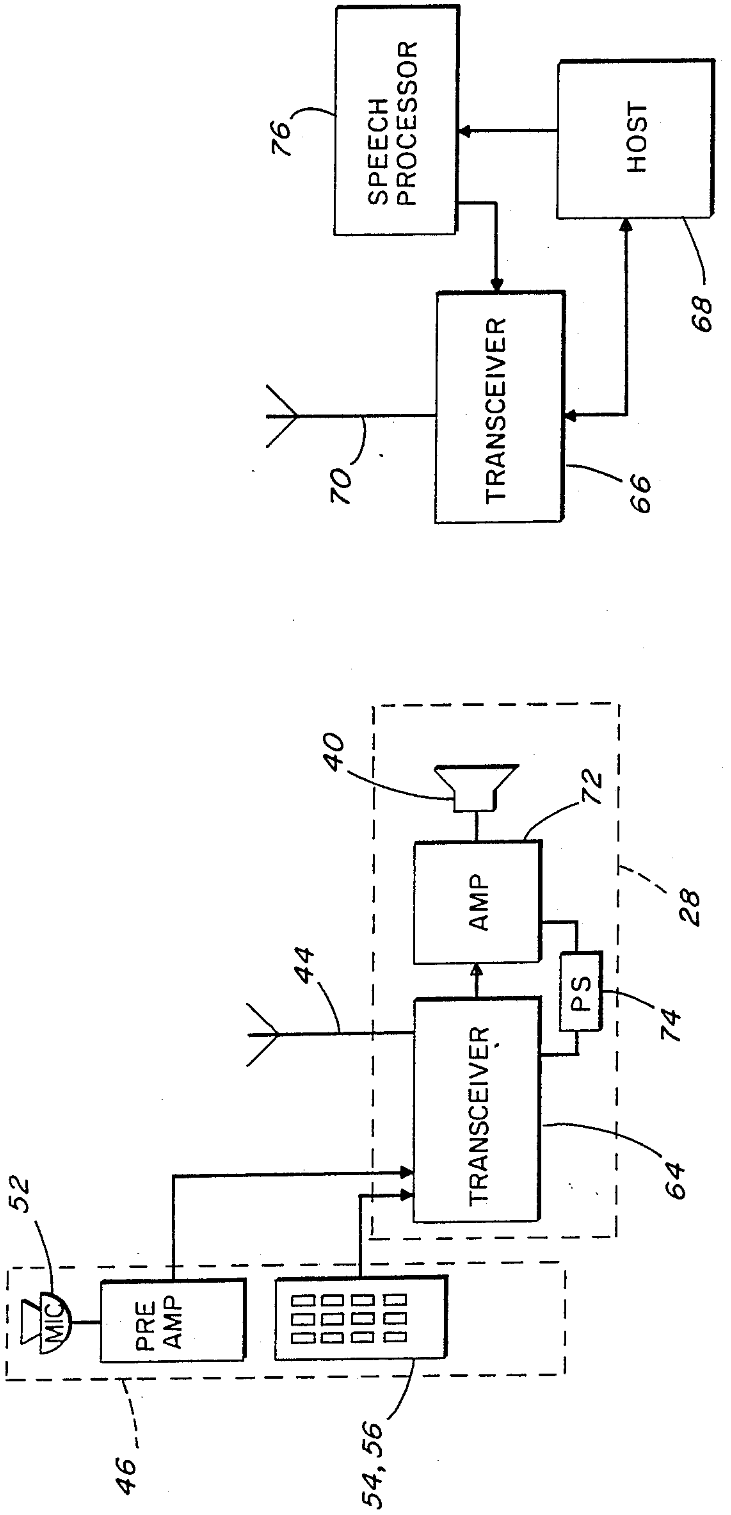
FIG. 3 is a simplified block diagram of the present invention.

Referring now to FIG. 3, a simplified block diagram is presented, showing the major functional elements of the audio communications system of the present invention and the functional elements associated with a host device. For illustrative purposes, in FIG. 3, the audio communications module 28 has telephone module 46 coupled thereto.

The host device 68 may simply be a telephone base unit, similar to a standard cordless telephone unit, which is well known in the art. Alternatively, the host may be any source of audio communications, including a computer as illustrated in FIG. 3.

In the transmitting mode, the directional microphone 52 and preamplifier 62 provide a means for inputting audio communications to the transceiver 64, and the keypad 56 provides a means for inputting touch tones. The transceiver 64 is a low power, short range FM transmitter/receiver, similar in design to the inexpensive units used in standard cordless telephones. The operating frequency of transceiver 64 is matched to that of a transceiver 66, coupled to the host device 68. An antenna 44 is mounted within audio communications module 25, as stated before, and a second antenna 70 is coupled to the second transceiver 66.

In the receiving mode, the transceiver 64 demodulates the received signal and presents it amplifier 72, the output of which is used to drive the acoustic transducer 40. Power for the transceiver and amplifier are provided by rechargable power supply 74.

In FIG. 3, the host device 68 is shown to be coupled to a speech processor 76. Speech processor 76 is simply a text-to-speech message facility. The host 68 outputs text in the form of ASCII character codes, and the speech processor 76 translates the codes into electrical signals which are representative of synthesized speech. These signals are transmitted via transceiver 66 to the audio communications module 28, where they are converted into sound. The audio communications module 28 provides no code translation functions itself.

In the typical office environment, a number of audio communications modules 28 will be in use at the same time, in the same building location, and quite possibly in adjacent offices. Where several modules are used, it is desirable for each audio communications module 28 to have its own assigned frequency, to avoid the problem of one user's audio messages being received by another user. In a building having many audio communications modules 28 at the same time, the number of allocated frequencies necessary to prevent interference could be correspondingly great. It is therefore desirable to limit the power of the individual transceivers, so as to provide a range of approximately fifty feet, and thereby minimize the number of frequencies which must be allocated.

Figure 4:
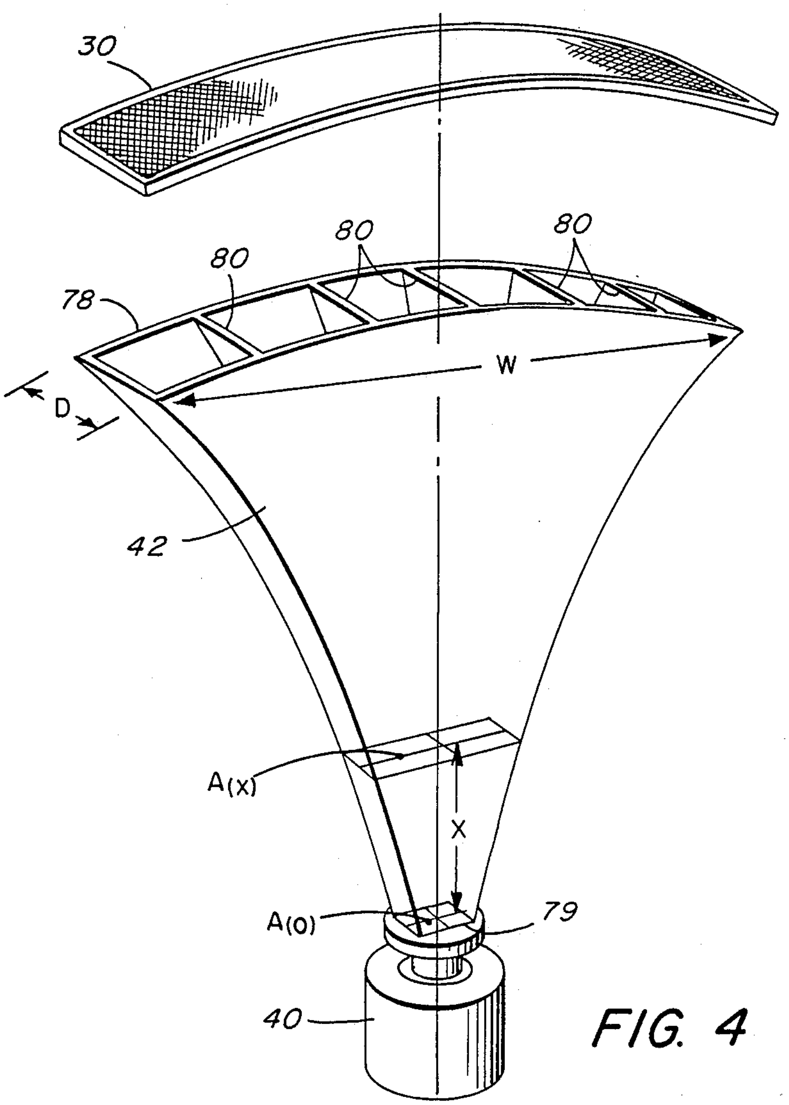
FIG. 4 illustrates the major acoustic generating components of the present invention.

Turning now to FIG. 4, the structure and design of the acoustic horn 42 is presented in more detail. The acoustic horn 42 is fabricated from plastic having sufficient thickness to provide rigidity and prevent unwanted resonance at sound frequencies generated by the acoustic transducer or otherwise absorb sound energy from the system. Cross members 80 extend laterally across mouth 78 to provide the horn with additional structural rigidity. The grill 30, which fits over the mouth 78 of the acoustic horn 42 is an acoustically transparent fabric, and prevents dust and foreign material from dropping into the horn 42. The acoustic horn 42 is positioned with its throat 79 at the output of acoustic transducer 40. The, throat 79 is basically square, having a side dimension of 0.9 inches. The acoustic transducer 40 is a standard high efficiency sound generator which receives an electrical signal input from amplifier 72, shown in FIG. 3.

A horn type loudspeaker was chosen because it fulfilled the criteria deemed to be important to a device such as the audio communications module 28. It had to be a high fidelity system with low distortion and flat response over the predominant frequencies of the human voice audio spectrum. The sound quality of the output had to be very good to provide excellent intelligibility at low sound levels. It had to provide a directional audio output so as to minimize lateral sound dispersion, and hence the impact on users in adjacent office areas. It had to operate at high efficiency to conserve battery power. It had to be cost effective. Finally, it had to be a size that could be easily accommodated by the audio communications module 28.

The acoustic horn 42 of the present invention has the primary functions of intensifying low level sound and shaping the sound to obtain optimal sound dispersion characteristics for the audio communications module 28. The acoustic horn 42 is an exponential flair type, as opposed to the conical type, to radiate low frequencies more efficiently. The acoustic horn 42 has a rectangular cross section, as can be seen with reference to FIG. 4. It is advantageous to maintain the thickness of the horn as nearly constant, due to the desirability of keeping the housing 36 of audio communications module 28 nearly flat.

Figure 5:
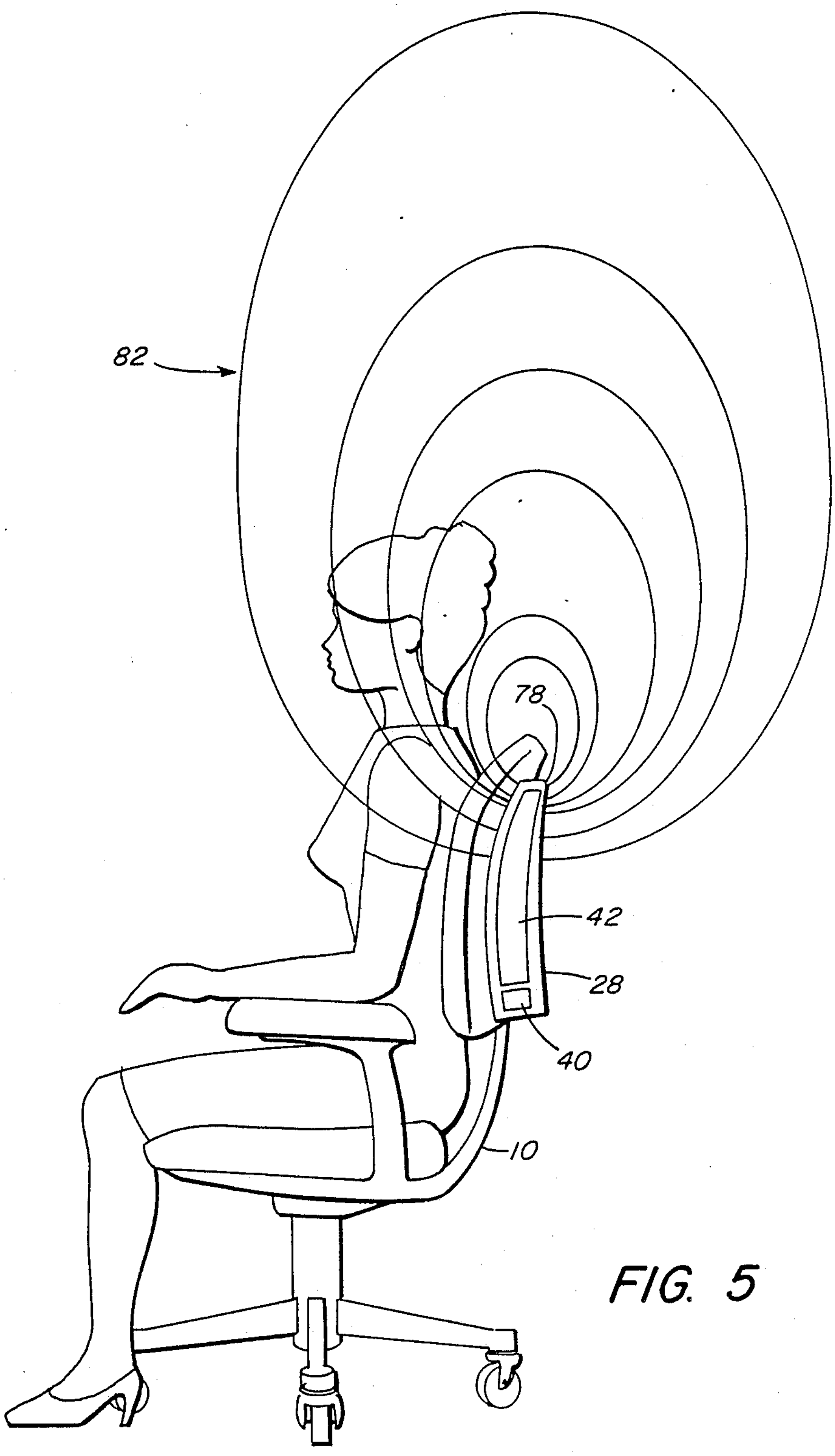
FIG. 5, illustrates the sound contour patterns generated by the present invention when in operation.

Concerning the size of the mouth 78 of the acoustic horn 42, the width dimension is relatively long compared with its depth. In the preferred embodiment, the width is approximately 14.5 inches and the depth is approximately 1.5 inches. It is desirable that the mouth 78 be sufficiently wide so that a nearly even sound dispersal is provided across the entire width of the backrest 14. This will ensure that a user, sitting in the chair 10, will be able to clearly hear the sound emitted from the acoustic horn 42 as he moves his head freely in any position along the backrest 14. The smaller depth dimension ensures a desirable shaping of the sound contours, as illustrated in FIG. 5. Typically, the width should be at least five times greater than the depth.

As is well known in the art, acoustic horns provide higher efficiency due to the improved impedence match at the mouth of the horn that results from the increase in area from the throat to the mouth. In addition, the area difference permits relatively small piston displacements in the acoustic transducer 40, which reduce distortion and minimize the energy required to drive the system. A transducer this small will be relatively inexpensive.

The criteria for designing an acoustic horn are well known and strive to maintain a constant rate of increased of horn area on the axis of the horn. Optimal flare is achieved by the wavefront and horn wall intersection orthogonal. The faster a horn flares, the lower will be the distortion due to adiabatic expansion and contraction of the air. These design objectives are summarized by the general equation:

$$A(x)=A_0e^{mx}$$

where $A(x)$ = the cross sectional area of the horn at a distance x from the throat $A_0$ = the cross sectional area of the throat of the horn m = a constant which determines the rate of flair or the increase in the cross sectional area of the horn x = the distance measured along the major axis of the horn In the preferred embodiment, the dimension x along the major axis, from the throat 79 to the mouth 78 is 12.0 inches.

FIG. 5 illustrates the functioning of the acoustic horn 42, in particular the dispersion of sound in relationship to a user. The sound pressure levels contours 82 are shown to be directed upwardly toward the user's ears, while little sound is broadcast horizontally to disturb others in the environment.

In operation, with the audio communications module installed on an office chair 10, the user adjusts the volume control 32 to a level of sound comfort, usually slightly above the ambient sound level in an office environment, which is generally on the order of NC25 to NC30 (decibels). The user, now seated in the chair 10, can clearly hear audio messages emitted from the audio communications module 28 in privacy while others in the office environment will not be disturbed by additional noise. A person standing in the office, six to eight feet from chair 10, would have little awareness that the user of chair 10 is listening to an audio message. The user, seated in chair 10, has the freedom of movement to roll the chair around his office space and position his head variously, in relation to the backrest 14, while still hearing the audio messages.

In two way communications, the user would, for example, dial a telephone number with telephone module 46, mounted on the armrest 16, and make a connection. With the directional microphone 52 aimed toward his head, the user would converse in normal voice levels, while listening in privacy.

In view of the above, it will be seen that the several objects of the present invention are readily achieved and other advantageous results attained.

Obviously many modifications and variations of the present invention are possible in light of the above teachings, without departing from the spirit and scope of the invention. For example, although two way communication was disclosed, the invention could use the audio communications module alone, simply as a personal loudspeaker system. While it is a desirable feature to have the audio communications module be an add on feature for existing office chairs, thus reducing the cost, it is conceivable that office chairs could be advantageously manufactured with the audio communications system included within chair's basic structure, possibly integral with the backrest. Although the present invention is most useful in an office environment, it is further conceivable that the present invention could be used in fixed, or semi fixed environments, such as in movie theaters or airliners, automobiles, and other vehicles, where the seats are stationary relative to the floor. Still further, the type of audio communications may not be considered limiting, as it is conceivable that the present invention may be used to receive broadcast sources, such as radio and television, as well as prerecorded entertainment or information sources, such as cassette tapes or dictaphone. In view of this, it is understood that the above description is illustrative rather than limiting.

What is claimed is:

1. A speaker system for use with a chair having a backrest, comprising a housing for mounting on the rear side of the backrest;

means, within the housing, for receiving an electrical signal representative of a sound;

transducer means, within said housing, for generating an audio signal in response to the electrical signal; and an acoustic horn, coupled to the transducer means, for focusing and amplifying sound;

said acoustic horn having a mouth with a rectangular cross section and a width dimension which is substantially equal to the width of said backrest;

said acoustic horn being oriented within said housing to focus sound upwardly and evenly across the width of the backrest.

2. A speaker system as recited in claim 1, wherein the means for receiving an electrical signal is a radio transceiver.

3. A speaker system as recited in claim 1, wherein the mouth of the acoustic horn has width at least five times greater than the depth.

4. A private speaker system for use with a chair having a backrest comprising a housing for mounting on the rear of the backrest;

means, within the housing, for receiving an electrical signal representative of a sound;

an acoustic horn, within the housing, having a throat and a rectangular mouth extending upwardly through the housing; and transducer means, positioned at the throat of the horn, for generating a sound in response to the electrical signal;

the rectangular mouth of the horn having a width equal to the width of the backrest for focusing the sound upwardly and evenly across the width of the backrest and for limiting lateral dispersion of the sound.

5. A private speaker system as recited in claim 4, wherein the means for receiving an electrical signal is a radio transceiver.

6. A private speaker system as recited in claim 4, wherein the mouth of the acoustic horn has a width at least five times greater than the depth.

7. A communications system for receiving audio messages from a computer comprising a chair having a backrest;

a housing mounted on the rear of the backrest;

means, within the housing, for receiving electrical signals representative of audio messages from a computer host with a text-to-speech message facility;

transducer means, coupled to said receiver means, for generating audio signals representative of audio messages in response to the electrical signals; and acoustic focusing means, coupled to the transducer means, for directing the audio signals upwardly and evenly across the width of the backrest so that the sound is focused principally at the upper portion of the backrest and lateral dispersion of the sound is minimized.

8. A system as recited in claim 7, wherein the focusing means is integral with the backrest of the chair.

9. A system as recited in claim 7, wherein the focusing means is an acoustic horn.

10. A system as recited in claim 7, wherein the chair is an office chair having casters.

11. A system as recited in claim 7, wherein the chair is located in a vehicle.

12. A telephone system comprising a chair having a backrest and an armrest;

a housing mounted on the backrest;

a speaker system within the housing;

a telephone keypad mounted on the armrest;

a microphone mounted on the armrest; and a radio transceiver in the housing for sending and receiving telephone communications, the transceiver being electrically coupled to the telephone keypad, the microphone, and speaker system;

said speaker system including transducer means for generating audio signals in response to electrical signals representative of telephone communications and an acoustic horn, coupled to the transducer means, for focusing and amplifying sound;

said acoustic horn having a mouth with a rectangular cross section and a width dimension which is substantially equal to the width of said backrest;

said acoustic horn being oriented within said housing to focus sound upwardly and evenly across the width of the backrest.

13. A system as recited in claim 12, wherein the focusing means is integral with the backrest of the chair.

14. A system as recited in claim 12, wherein the focusing means is an acoustic horn.

15. A system as recited in claim 12, wherein the chair is an office chair having casters.

16. A system as recited in claim 12, wherein the chair is located in a vehicle.

17. A system as recited in claim 12, wherein the seat is located in an automobile.

18. A private audio communications system comprising a chair having a backrest;

a speaker attached to the backrest having a rectangular cross section and a width dimension which is substantially equal to the width of said backrest;

means, coupled to the chair, for receiving a transmitted radio signal representative of audio communications;

transducer means for generating an audio signal in response to the signal;

said speaker means focusing the audio signal upwardly and evenly across the width of the backrest.

* * * * *